(12) United States Patent
Lukacs et al.

(10) Patent No.: US 8,433,479 B2
(45) Date of Patent: Apr. 30, 2013

(54) ADAPTIVE FRONT-LIGHTING SYSTEM WITH FUZZY LOGIC CONTROL

(75) Inventors: Luciano Lukacs, Sao Paulo (BR); Mahendra Somasara Dassanayake, Bloomfield Hills, MI (US); Iuri Muniz Pepe, Salvador (BR); Robson da Silva Magalhaes, Salvador (BR); Christiano Hora De O. Fontes, Salvador (BR); Marcelo Embirucu, Vilas do Atlantico (BR)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 13/023,632

(22) Filed: Feb. 9, 2011

(65) Prior Publication Data

US 2012/0203432 A1    Aug. 9, 2012

(51) Int. Cl.
*A01B 69/00* (2006.01)
*B62D 6/00* (2006.01)
*B62D 11/00* (2006.01)
*B62D 12/00* (2006.01)
*B63G 8/04* (2006.01)
*G05D 11/00* (2006.01)

(52) U.S. Cl.
USPC .............................................. 701/42; 701/45

(58) Field of Classification Search ............... 701/42, 701/36, 77, 45; 315/77, 82; 362/503
See application file for complete search history.

(56) References Cited

U.S. PATENT DOCUMENTS

| | | | |
|---|---|---|---|
| 6,587,573 B1 * | 7/2003 | Stam et al. | 382/104 |
| 6,861,809 B2 * | 3/2005 | Stam | 315/82 |
| 6,868,322 B2 * | 3/2005 | Stam et al. | 701/36 |
| 6,928,180 B2 * | 8/2005 | Stam et al. | 382/104 |
| 6,947,576 B2 * | 9/2005 | Stam et al. | 382/104 |
| 7,149,613 B2 * | 12/2006 | Stam et al. | 701/36 |
| 7,302,326 B2 * | 11/2007 | Stam et al. | 701/36 |
| 7,321,112 B2 * | 1/2008 | Stam et al. | 250/216 |
| 7,630,803 B2 * | 12/2009 | Stam et al. | 701/36 |
| 7,653,215 B2 * | 1/2010 | Stam | 382/104 |
| 7,696,903 B2 * | 4/2010 | Stam et al. | 340/907 |

(Continued)

FOREIGN PATENT DOCUMENTS

| | | | |
|---|---|---|---|
| JP | 301-4739 | * | 1/1991 |
| JP | 3014739 A | | 1/1991 |
| KR | 20020021832 | * | 3/2002 |
| KR | 20020021832 A | | 3/2002 |

*Primary Examiner* — Thomas Black
*Assistant Examiner* — Robert Payne
(74) *Attorney, Agent, or Firm* — Frank A. MacKenzie; MacMillan, Sobanski & Todd, LLC

(57) ABSTRACT

An adaptive front-lighting system is provided for a vehicle, such as a passenger car, truck, or tractor trailer. A plurality of LED light sources on the vehicle have a projection pattern for exterior illumination to supplement a main beam from a main light source. A power supply drives the LED light sources according to a driving signal having a magnitude between a minimum driving signal and a maximum driving signal, wherein the LED light sources sequentially illuminate in response to the magnitude of the driving signal. A speed sensor characterizes an instantaneous vehicle speed. A turn sensor characterizes an instantaneous turning radius. A fuzzy controller generates the driving signal in response to the instantaneous vehicle speed and the instantaneous turning radius based on a fuzzy model. The fuzzy model is characterized by a plurality of empirically-derived fuzzy rules that define discontinuous values and by a plurality of modified consequents that produce a substantially continuous output.

12 Claims, 5 Drawing Sheets

U.S. PATENT DOCUMENTS

| | | | |
|---|---|---|---|
| 7,825,600 B2* | 11/2010 | Stam et al. | 315/82 |
| 7,881,839 B2* | 2/2011 | Stam et al. | 701/36 |
| 7,983,817 B2* | 7/2011 | Breed | 701/45 |
| 8,045,760 B2* | 10/2011 | Stam et al. | 382/104 |
| 8,065,053 B2* | 11/2011 | Stam et al. | 701/36 |
| 8,080,942 B2* | 12/2011 | Heider et al. | 315/77 |
| 8,103,422 B2* | 1/2012 | Bradai et al. | 701/77 |
| 2005/0073853 A1* | 4/2005 | Stam | 362/503 |
| 2006/0016965 A1* | 1/2006 | Stam et al. | 250/216 |
| 2006/0018511 A1* | 1/2006 | Stam et al. | 382/104 |
| 2008/0249706 A1 | 10/2008 | Bradai et al. | |
| 2010/0213872 A1 | 8/2010 | Heider et al. | |
| 2012/0203432 A1* | 8/2012 | Lukacs et al. | 701/42 |

* cited by examiner

ADAPTIVE FRONT-LIGHTING SYSTEM WITH FUZZY LOGIC CONTROL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to adaptive front-lighting systems for vehicles, and, more specifically, to a fuzzy logic control system for sequentially illuminating supplemental LED light sources in response to vehicle speed and turning radius.

Exterior lighting systems known as Adaptive Front-lighting Systems (AFS) have been introduced on motor vehicles to increase traffic safety at night by directing light forward of the vehicle according to speed, direction, and the presence of other vehicles. An AFS system may include an array of light-emitting diodes (LEDs) with optics to generate a beneficial beam pattern, an electronic power driving system, and an onboard micro-controller to activate various ones of the LEDs in the array as needed. In a preferred embodiment, the LED array provides light in a beam pattern that is supplemental to a main light source such as an incandescent or high-intensity discharge (HID) source that provides a constant (i.e., low beam) illumination.

In order to achieve optimum light distribution without distraction to the driver, it is desirable to smoothly increase or decrease the supplemental lighting as the conditions requiring the supplemental lighting change. The LEDs are typically driven in a sequential manner with a first LED being activated first which has a supplemental beam pattern closest to the main beam. As more supplemental lighting is needed, additional LEDs are activated which provide a beam pattern progressively farther from the main beam. Furthermore, each LED is ramped in brightness between fully off and fully on. Thus, the electronic controller generates a variable driving signal in response to instantaneous conditions so that as more supplemental illumination is needed, it activates the first LED with an increasing brightness until it is fully illuminated and then activates the second with increasing brightness, and so on.

Typical vehicle conditions for controlling the AFS include vehicle speed and turning radius because a wider illumination pattern is desired while turning, but the degree of increase also depends on the speed at which the turn is taken. It has been suggested that a controller for such an AFS may be based on fuzzy logic (see Lukacs et al, *Impact of Adopting Fuzzy Logic to Control an LED AFS (adaptive front-lighting system)*, SAE Technical Paper Series 2007-01-2784, 2007). However, what has been lacking are methods for the derivation of actual rules for a fuzzy logic controller that can be efficiently obtained while providing optimized performance according to a type of vehicle (e.g., passenger car, light truck, or heavy truck) and driving environments of different geographic locations where a vehicle is used (e.g., various countries with right-hand drive versus left-hand drive or with different standards of road building or types of city versus rural infrastructures).

SUMMARY OF THE INVENTION

In one aspect of the invention, an adaptive front-lighting system is provided for a vehicle, such as a passenger car, truck, or tractor trailer. A plurality of LED light sources on the vehicle have a projection pattern for exterior illumination to supplement a main beam from a main light source. A power supply drives the LED light sources according to a driving signal having a magnitude between a minimum driving signal and a maximum driving signal, wherein the LED light sources sequentially illuminate in response to the magnitude of the driving signal. A speed sensor characterizes an instantaneous vehicle speed. A turn sensor characterizes an instantaneous turning radius. A fuzzy controller generates the driving signal in response to the instantaneous vehicle speed and the instantaneous turning radius based on a fuzzy model. The fuzzy model is characterized by a plurality of empirically-derived fuzzy rules that define discontinuous values and by a plurality of modified consequents that produce a substantially continuous output.

DETAILED DESCRIPTION OF PREFERRED EMBODIMENTS

The AFS system of this invention senses when a vehicle is approaching a curve and directs the LEDs in the array to switch on sequentially. As the vehicle turns, the LEDs illuminate at a rate and intensity determined by the degree and speed of the turn. Electronic sensors analyze inputs from the steering wheel and the vehicle speed to determine how and when to illuminate the LEDs. The LEDs gradually switch off when the road straightens out, but the main beam continues to illuminate the road.

The total amount of luminous flux is linearly related to the total current as determined by a controller using a fuzzy model. Each increment of 350 mA in the light current causes an LED to operate at full brightness, and the LEDs are activated in a sequential order. As described further below, the fuzzy model is preferably based on the two variables of speed and turning radius (or, equivalently, turning angle) with the antecedents of the fuzzy rules being defined for various fuzzy ranges of speed and radius. The specific limits for the ranges and the consequents of the fuzzy rules are determined as described below.

Figure 1:
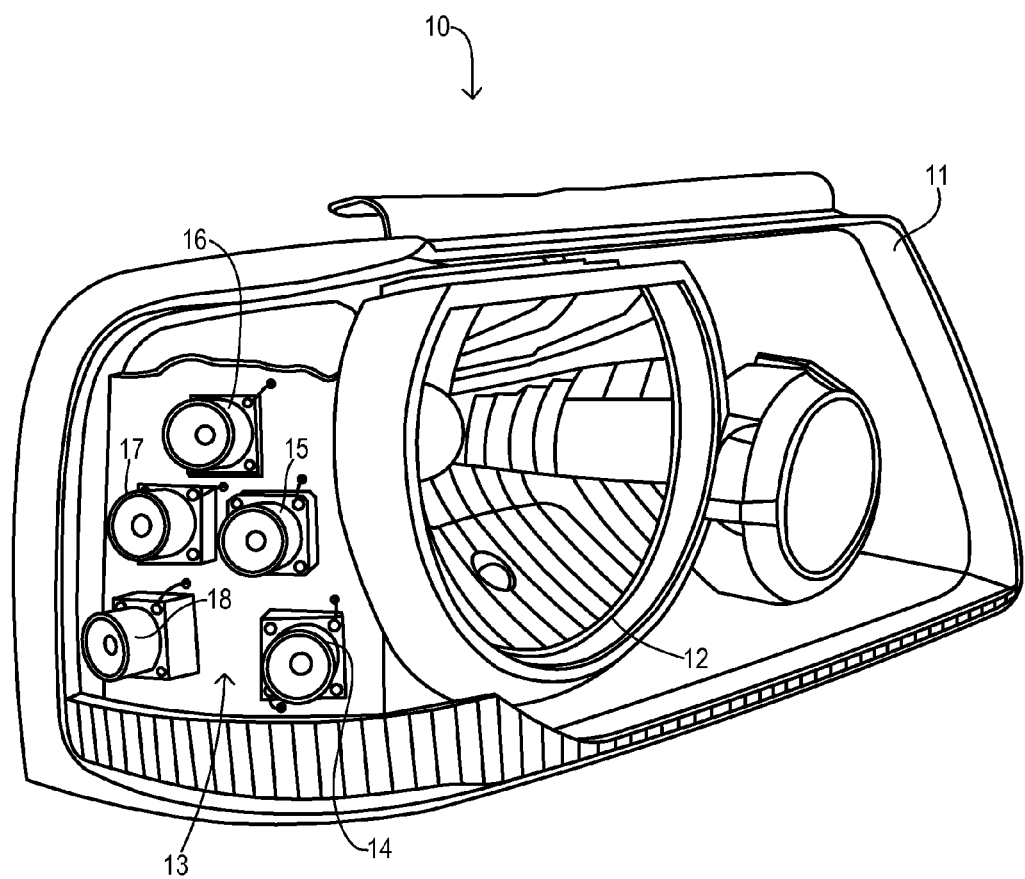
FIG. 1 is a perspective view of a headlamp system with a main light source and a supplemental LED array.

Referring now FIG. 1, a headlamp system 10 for one side of a vehicle includes a housing 11 containing a main light source 12. Supplementary light is provided by an LED array 13 containing individual LEDs 14-18. The present invention preferably utilizes white light LEDs, which are available for automotive applications from companies including Osram GmbH and Philips Lumileds Lighting Company. LEDs are chosen as supplemental light sources in order to obtain various benefits including low power requirement, high efficiency, long life, and fast response. Each LED is preferably assembled with individual optics, e.g., a lens with an aperture angle and direction adapted to project the supplemental light from each LED into a corresponding beam pattern to the front and/or side of the vehicle.

Figure 2:
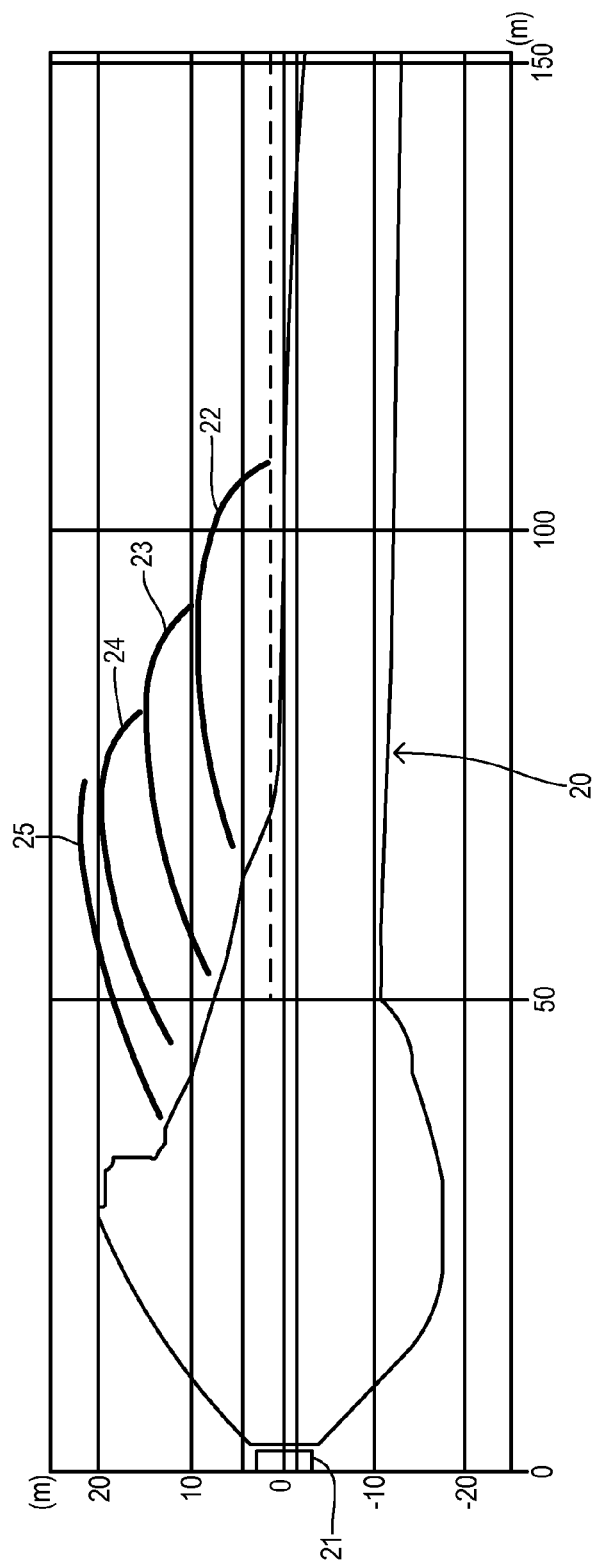
FIG. 2 is a plot showing a main beam and supplemental beams.

FIG. 2 shows a main beam pattern 20 projecting in front of a vehicle 21 showing that at further distances from vehicle 21 the main beam pattern remains narrow to avoid glare for oncoming vehicles. Supplemental beam patterns 22-25 illustrate a progressively wider beam pattern produced by an AFS system on the left hand side of vehicle 21 that is produced by progressively activating the corresponding LEDs. Each beam pattern 22-25 corresponds to a respective LED in the sequence reaching full brightness. A smoothly varying beam pattern is obtained between the shown limits by providing a continuously-adjustable current to control the LEDs to a partial brightnesses.

Figure 3:
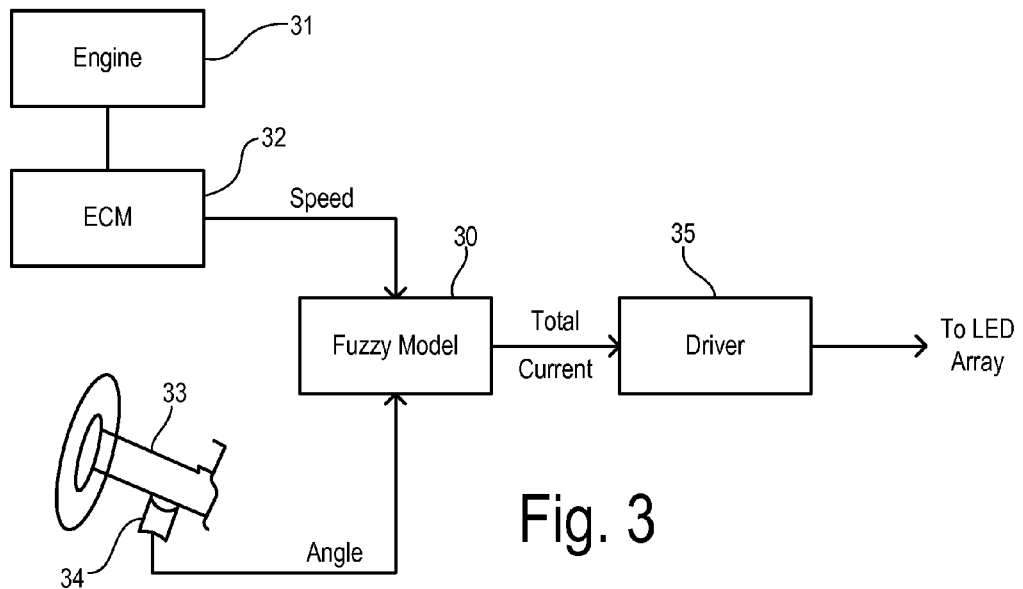
FIG. 3 is a block diagram showing one embodiment of the present invention.

A control system of the present invention is shown in greater detail in FIG. 3. A fuzzy logic controller 30 incorporates a fuzzy model characterized by various fuzzy rules described below. An engine 31 of the vehicle is coupled to an engine control module (ECM) 32 which provides an instantaneous speed measure to fuzzy model 30. ECM 32 may function as a speed sensor or a separate speed sensor such as a transmission sensor could be used. A steering mechanism 33 such as a steering wheel and steering column includes a steering wheel turn sensor 34 for providing a steering angle measurement to fuzzy model 30. Preferably, the angle measurement is converted into a measurement of a corresponding turn radius within controller 30 or turn sensor 34. Vehicle speed and turning radius can alternatively be obtained from other types of sensors as known in the art.

The fuzzy model uses instantaneous vehicle speed from the speed sensor and instantaneous turning radius from the turn sensor to generate a driving signal representing a command for the total LED current. The driving signal is provided to a driver 35 which steers the proper supply currents to the respective LEDs.

Figure 4:
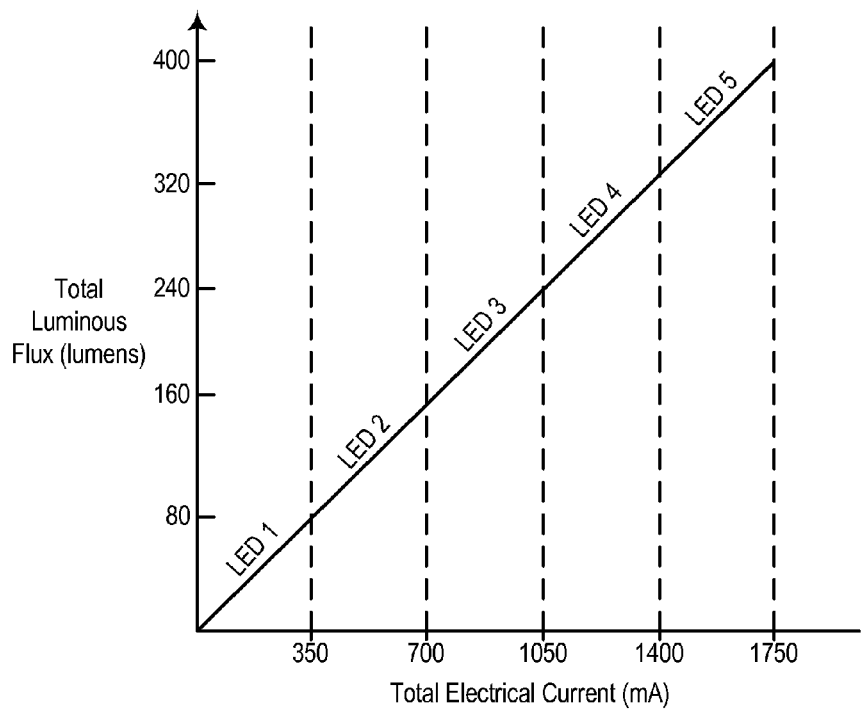
FIG. 4 is a plot showing the relation between an LED total current driving signal and the resulting luminous output.

FIG. 4 shows the total luminous flux output resulting from different values of total electrical current. At commanded current values between zero and 350 mA, a first LED in the array has a linearly increasing flux output. Between 350 and 700 mA of total current, the first LED remains fully on and a second LED is activated according to a linearly increasing flux output. The remaining LEDs activate in sequence according to the total magnitude of electrical current. Thus, as long as the controller provides a transfer function that progresses smoothly along the sloping line of FIG. 4, there are no sudden jumps in the supplemental light output that would otherwise be distracting to the driver.

A development process for defining an appropriate function to generate the appropriate driving signal based on inputs of speed and turning radius which is both robust and efficient has been lacking. The present invention solves this problem. Development of a fuzzy model proceeds initially with definition of preliminary fuzzy rules in an empirical manner by a human expert or specialist. The specialist conducts an empirical study of desired headlamp performance based on the specialist's understanding of typical headlamp performance, environmental conditions, and driver habits and needs. The empirical design effort may further rely on surveys conducted with drivers in the market or region where a particular AFS system will be used. In view of their expert knowledge and the survey results, the specialist determines the desirable parameters values for controlling the AFS.

Among the many factors that may be considered by the specialist in determining appropriate lighting performance include nighttime traffic patterns, typical grade and radius of highway entrances and exits, prevalence of sharp turns in mountainous terrains, size and frequency of shoulders along the roads, likelihood of pedestrians and cyclists being present, typical placement of traffic signs, characteristics and frequency of bridges and tunnels, the types of other vehicles on the road, and many other factors.

The specialist's understanding of the foregoing can be enhanced by surveys to help understand the needs and behavior of both truck drivers and car drivers. Issues addressed in a survey can include characteristics of drivers' use of low and high beam headlamps in different conditions, driver opinions regarding desirable beam patterns under different circumstances, and driver perception of glare from the headlamps of other vehicles. Surveys may preferably include groups of drivers of both cars, light trucks, and heavy trucks, and cover various road conditions to help the specialist understand drivers' behavior over a wide variety of circumstances to allow better development of fuzzy rules that are effective over this wide variety of circumstances. For example, a truck driver may be more concerned with supplemental lighting to the side of the vehicle during turning because of the larger size of their vehicle and the greater visibility in a truck cabin due to a larger windshield and higher vantage point as compared with a car. In contrast, a car driver is typically more interested in supplemental lighting generally toward the front of the vehicle and along the side of the road due to the more limited field of vision through a car windshield. Based on the specialist's knowledge and the critical analysis of data collected in driver surveys, desirable light distribution beam patterns for both low and high beam and both left and right sides of a vehicle according to speed and turning radius are developed. For verification, the beam patterns may be implemented in a prototype vehicle and then tested on a vehicle test track or other simulation.

To account for the various combinations of vehicle speed and turning radius that give rise to different configurations for the desired beam pattern, fuzzy logic is used by the specialist to generate the model for relating the speed and turning radius to a desired total current supplied to the supplemental LED array. In a preferred embodiment, fuzzy values of high, medium, and low are adopted for the speed and large, medium, and small for the turning radius. The specialist determines the actual numerical limits or ranges of values for each fuzzy variable and the corresponding output for each of the combinations of fuzzy values for the speed and turning radius. With two variables with three fuzzy ranges, there are nine possible combinations of fuzzy values, but the combination of high speed and small turning radius is excluded since the combination would not be possible in practice (i.e., could lead to the vehicle rolling over). Table 1 below shows specialist defined fuzzy rule antecedents and consequents for a car and Table 2 shows a similar model derived for a truck.

TABLE 1

(Car)

| Rule # | Fuzzy Rule Antecedents | Fuzzy Rule Consequents (Current to LEDs) |
|---|---|---|
| 1 | If speed < 40 km/h and radius < 50 m | 1,750 mA |
| 2 | If speed < 40 km/h and 50 m < radius < 280 m | 1,400 mA |
| 3 | If speed < 40 km/h and radius > 280 m | 1,050 mA |
| 4 | If 40 km/h < speed < 90 km/h and radius < 50 m | 1,350 mA |
| 5 | If 40 km/h < speed < 90 km/h and 50 m < radius < 280 m | 1,000 mA |
| 6 | If 40 km/h < speed < 90 km/h and radius > 280 m | 700 mA |
| 7 | If speed > 90 km/h and radius > 280 m | 350 mA |
| 8 | If speed > 90 km/h and 50 m < radius < 280 m | 0 |

TABLE 2

(Truck)

| Rule # | Fuzzy Rule Antecedents | Fuzzy Rule Consequents (Current to LEDs) |
|---|---|---|
| 1 | If speed < 45 km/h and radius < 40 m | 1,750 mA |
| 2 | If speed < 45 km/h and 40 m < radius < 250 m | 1,400 mA |
| 3 | If speed < 45 km/h and radius > 250 m | 1,050 mA |
| 4 | If 45 km/h < speed < 65 km/h and radius < 40 m | 1,350 mA |
| 5 | If 45 km/h < speed < 65 km/h and 40 m < radius < 250 m | 1,000 mA |
| 6 | If 45 km/h < speed < 65 km/h and radius > 250 m | 700 mA |
| 7 | If speed > 65 km/h and radius > 250 m | 350 mA |
| 8 | If speed > 65 km/h and 50 m < radius < 250 m | 0 |

In each case, rule #1 has an antecedent corresponding to low speed and small (i.e., sharp) turning radius. As a consequent, the greatest amount of supplemental illumination is provided by the LEDs by commanding a total current of 1,750 mA. At the medium and large turning radii of rules #2 and #3, progressively less supplemental lighting is provided in the consequents. Rules #4 to #6 correspond to medium speed and to a small, medium and large radius, respectively. As compared to the LED currents for the low speed rules, the rules for medium speed utilize a slightly lower current. For high speed Rules #7 and #8, supplemental lighting is provided only when the turning radius is large. In the example being shown, the specialist determined that no supplemental lighting is needed during a medium turn when at high speed because of potential glare or interference of the supplemental light to other drivers.

Figure 5:
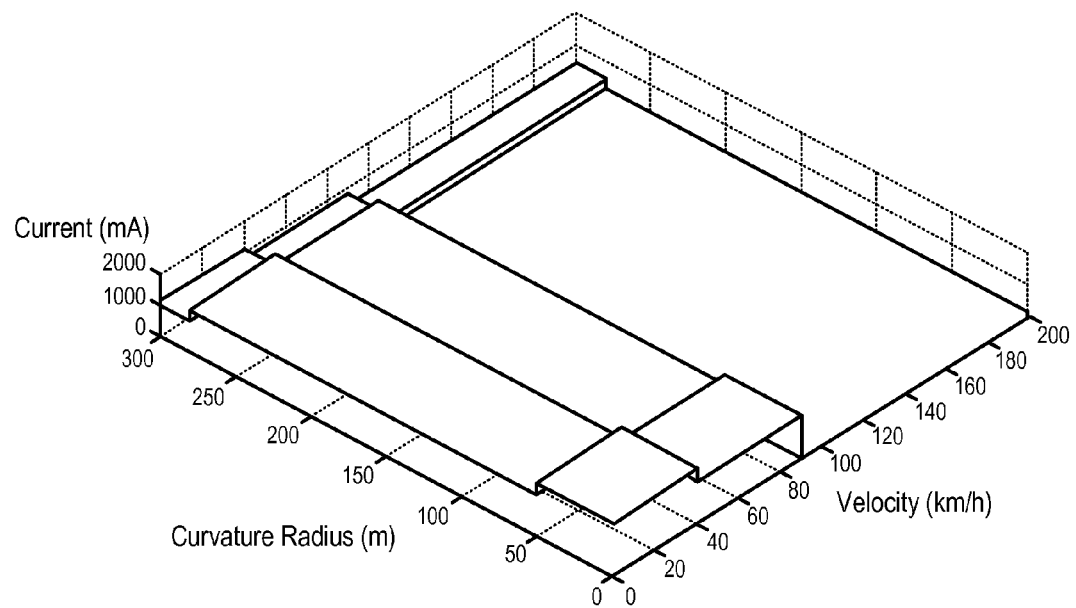
FIG. 5 is an input-output plot showing a total current driving signal for various fuzzy logic conditions as determined empirically by a human specialist.
Figure 6:
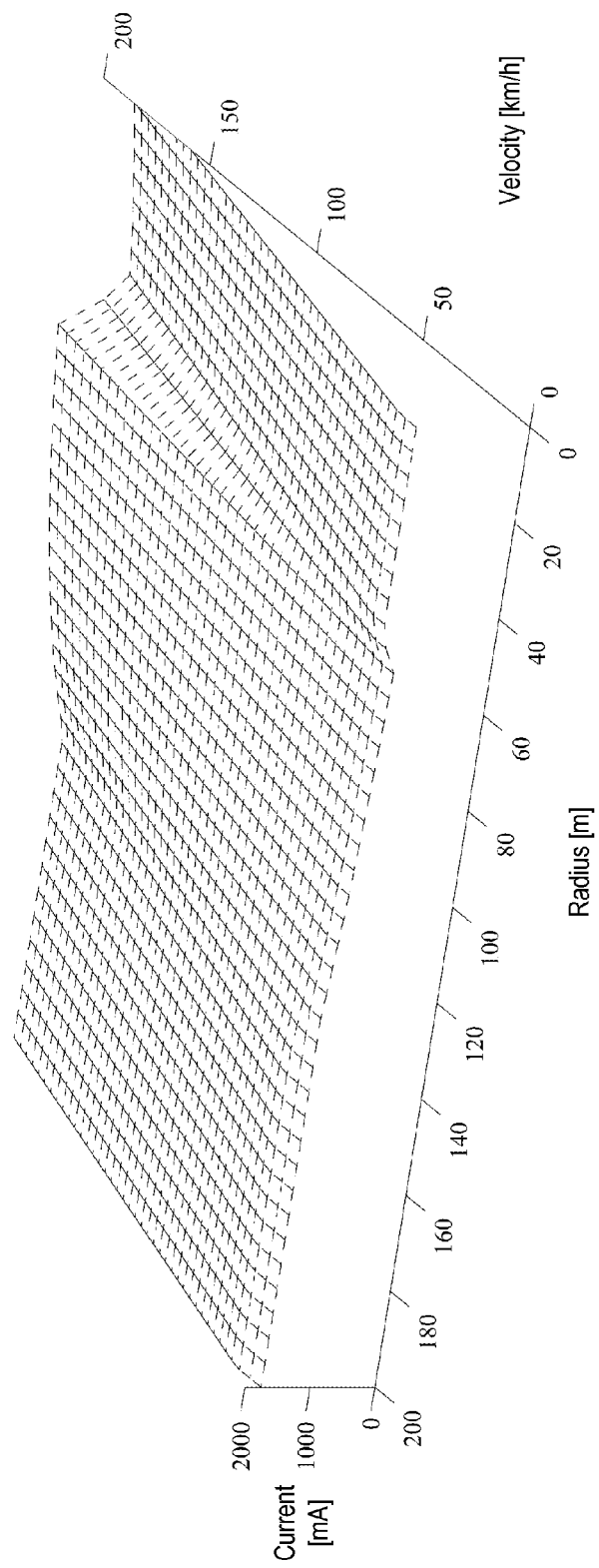
FIG. 6 is an input-output plot showing a total current driving signal from a modified fuzzy logic model wherein the consequents of the fuzzy rules have been modified to produce a substantially continuous output.

FIG. 5 depicts the output of the specialist's fuzzy rules in a 3-dimensional space that relates the instantaneously vehicle speed, the instantaneous turning radius, and the total LED current. A potential disadvantage of the specialist empirically-derived fuzzy rules is that they define discontinuous values. In other words, as the velocity and turning radius change, there may an instantaneous jump in the LED current output. Such switching on and off of a significant amount of supplemental lighting may be distracting to both the driver of the vehicle and other nearby vehicles. Therefore, the present invention employs modified consequents that will produce a substantially continuous output. In other words, the surface shown in FIG. 5 is smoothed out into a continuous surface as shown in FIG. 6. A fuzzy model with modified consequents is shown generally in Table 3 below.

TABLE 3

| Rule # | Fuzzy Rules with Modified Consequents (y is the total current to the LED array) |
|---|---|
| 1 | If Speed (V) is low and Radius (R) is large then $y = f_1(V, R)$ |
| 2 | If Speed is low and Radius is medium then $y = f_2(V, R)$ |
| 3 | If Speed is low and Radius is small then $y = f_3(V, R)$ |
| 4 | If Speed is medium and Radius is large then $y = f_4(V, R)$ |
| 5 | If Speed is medium and Radius is medium then $y = f_5(V, R)$ |
| 6 | If Speed is medium and Radius is small then $y = f_6(V, R)$ |
| 7 | If Speed is high and Radius is large then $y = f_7(V, R)$ |
| 8 | If Speed is high and Radius is medium then $y = f_8(V, R)$ |

Functions $f_1$ through $f_8$ can be derived in various ways so that the resulting total current smoothly varies within each rule and is substantially continuous at the transitions between fuzzy rules. In a preferred embodiment, a TSK fuzzy model for the functions is defined based on a simplification that the output varies within each rule only in response to the speed, as shown below in Table 4.

TABLE 4

| Rule # | Consequent Function f |
|---|---|
| 1 | $y = a_1 + b_1 \cdot V$ |
| 2 | $y = a_2 + b_2 \cdot V$ |
| 3 | $y = a_3 + b_3 \cdot V$ |
| 4 | $y = a_4 + b_4 \cdot V$ |
| 5 | $y = a_5 + b_5 \cdot V$ |
| 6 | $y = a_6 + b_6 \cdot V$ |
| 7 | $y = a_7 + b_7 \cdot V$ |
| 8 | $y = a_8 + b_8 \cdot V$ |

In this example, a plurality of model parameters $a_j$ and $b_j$ are defined, where j=1 through 8. The values for parameters a and b are preferably derived in a manner to reduce the mean quadratic error between the output y and the specialist-defined values for the output in the preliminary fuzzy model.

Known parameter estimation procedures are used to design the values for a and b, while keeping the intrinsic features of the fuzzy rules as defined by the specialist. Either type-1 fuzzy sets or type-2 fuzzy sets may be employed to represent the consequents using known methods which are well known to those skilled of the art. Consequent functions utilizing only the turning radius as an input or using both speed and radius as input can alternatively be used. With the foregoing procedures, separate models are easily obtained for various vehicle applications including different vehicle types and sizes and different driving environments or sales markets.

What is claimed is:

1. An adaptive front-lighting system for a vehicle, comprising:
    a plurality of LED light sources having a projection pattern for exterior illumination to supplement a main beam from a main light source;
    a power supply for driving the LED light sources according to a driving signal having a magnitude between a minimum driving signal and a maximum driving signal, wherein the LED light sources sequentially illuminate in response to the magnitude of the driving signal;
    a speed sensor for characterizing an instantaneous vehicle speed;
    a turn sensor for characterizing an instantaneous turning radius;
    a fuzzy controller generating the driving signal in response to the instantaneous vehicle speed and the instantaneous turning radius based on a fuzzy model, wherein the fuzzy model is characterized by a plurality of empirically-derived fuzzy rules that define discontinuous values and by a plurality of modified consequents that produce a substantially continuous output;
    wherein the empirically-derived fuzzy rules correspond to at least three ranges of vehicle speed and at least three ranges of turning radius, and wherein the fuzzy rules correspond to empirically selected limits for the vehicle speed ranges and the turning radius ranges, a size of vehicle, and a driving environment;
    wherein the modified consequents are comprised of parametric functions of the instantaneous vehicle speed and instantaneous turning radius; and
    wherein the fuzzy rules and modified consequents are substantially in a form comprising:
    1: If Speed is low and Radius is large then $y=f_1(V,R)$
    2: If Speed is low and Radius is medium then $y=f_2(V,R)$
    3: If Speed is low and Radius is small then $y=f_3(V,R)$
    4: If Speed is medium and Radius is large then $y=f_4(V,R)$
    5: If Speed is medium and Radius is medium then $y=f_5(V,R)$
    6: If Speed is medium and Radius is small then $y=f_6(V,R)$
    7: If Speed is high and Radius is large then $y=f_7(V,R)$, and
    8: If Speed is high and Radius is medium then $y=f_8(V,R)$.

2. The system of claim 1 wherein the size of vehicle is selected from a group comprising a passenger car, a pick-up truck, and a heavy truck.

3. The system of claim 1 wherein the turn sensor is comprised of a steering angle sensor.

4. The system of claim 1 wherein as the magnitude of the driving signal increases from the minimum driving signal to the maximum driving signal, a first LED light source illuminates with increasing brightness until it is fully illuminated and then a second LED light source begins to illuminate with increasing brightness.

5. A method for illuminating supplemental LED light sources on a vehicle, each having a respective projection pattern providing exterior illumination adjacent a main beam from a main light source, the method comprising the steps of:
    characterizing an instantaneous vehicle speed in response to a speed sensor;
    characterizing an instantaneous turning radius in response to a turn sensor;
    inputting the instantaneous vehicle speed and instantaneous turning radius into a fuzzy model to generate an output comprising a driving signal with a magnitude between a minimum driving signal and a maximum driving signal; and
    driving the LED light sources in response to the driving signal, wherein the LED light sources sequentially illuminate according to the magnitude of the driving signal;
    wherein the fuzzy model is characterized by a plurality of empirically-derived fuzzy rules that define discontinuous values and by a plurality of modified consequents that produce a substantially continuous output;
    wherein the empirically-derived fuzzy rules correspond to at least three ranges of vehicle speed and at least three ranges of turning radius, and wherein the fuzzy rules correspond to empirically selected limits for the vehicle speed ranges and the turning radius ranges, a size of vehicle, and a driving environment;
    wherein the modified consequents are comprised of parametric functions of the instantaneous vehicle speed and instantaneous turning radius; and
    wherein the fuzzy rules and modified consequents are substantially in a form comprising:
    1: If Speed is low and Radius is large then $y=f_1(V,R)$
    2: If Speed is low and Radius is medium then $y=f_2(V,R)$
    3: If Speed is low and Radius is small then $y=f_3(V,R)$
    4: If Speed is medium and Radius is large then $y=f_4(V,R)$
    5: If Speed is medium and Radius is medium then $y=f_5(V,R)$
    6: If Speed is medium and Radius is small then $y=f_6(V,R)$
    7: If Speed is high and Radius is large then $y=f_7(V,R)$, and
    8: If Speed is high and Radius is medium then $y=f_8(V,R)$.

6. The method of claim 5 wherein as the magnitude of the driving signal increases from the minimum driving signal to the maximum driving signal, a first LED light source illuminates with increasing brightness until it is fully illuminated and then a second LED light source begins to illuminate with increasing brightness.

7. The method of claim 5 wherein the size of vehicle is selected from a group comprising a passenger car, a pick-up truck, and a heavy truck.

8. The method of claim 5 wherein the turn sensor is comprised of a steering angle sensor.

9. The system of claim 1 wherein the modified consequents $f_1$ to $f_8$ each has a form $y=a_j \cdot V$ where the values of $a_j$ and $b_j$ maintain intrinsic features of the empirically-derived fuzzy rules.

10. The system of claim 9 wherein the values of $a_j$ and $b_j$ reduce a mean quadratic error between y and the empirically-derived fuzzy rules.

11. The method of claim 5 wherein the modified consequents $f_1$ to $f_8$ each has a form $a_j \cdot b_j \cdot V$ where the values of $a_j$ and $b_j$ maintain intrinsic features of the empirically-derived fuzzy rules.

12. The method of claim 11 wherein the values of $a_j$ and $b_j$ reduce a mean quadratic error between y and the empirically-derived fuzzy rules.

* * * * *